United States Patent
Noldus

(10) Patent No.: US 8,620,316 B2
(45) Date of Patent: Dec. 31, 2013

(54) METHOD AND APPARATUS IN A TELECOMMUNICATIONS NETWORK

(75) Inventor: Rogier August Caspar Joseph Noldus, Goirle (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 20 days.

(21) Appl. No.: 13/390,310

(22) PCT Filed: Aug. 17, 2009

(86) PCT No.: PCT/EP2009/060638
§ 371 (c)(1),
(2), (4) Date: Apr. 25, 2012

(87) PCT Pub. No.: WO2011/020494
PCT Pub. Date: Feb. 24, 2011

(65) Prior Publication Data
US 2012/0202494 A1    Aug. 9, 2012

(51) Int. Cl.
*H04W 4/00* (2009.01)
(52) U.S. Cl.
USPC .................... 455/435.1; 455/433; 455/435.2; 455/432.1
(58) Field of Classification Search
USPC .......................... 455/435.1, 433, 435.2, 432.1
See application file for complete search history.

(56) References Cited

U.S. PATENT DOCUMENTS

| | | |
|---|---|---|
| 2006/0149812 A1 | 7/2006 | Lin et al. |
| 2008/0090569 A1 | 4/2008 | Khan et al. |
| 2008/0146220 A1* | 6/2008 | Duan et al. .................. 455/432.1 |
| 2012/0320906 A1* | 12/2012 | Ku et al. ........................ 370/352 |
| 2013/0012200 A1* | 1/2013 | Mahdi ......................... 455/432.1 |
| 2013/0091289 A1* | 4/2013 | Yasrebi et al. ................ 709/227 |

FOREIGN PATENT DOCUMENTS

| | | |
|---|---|---|
| JP | 2009-513052 A | 3/2009 |
| WO | 2007045991 A1 | 4/2007 |

OTHER PUBLICATIONS

Cao, Yufei, et al., "A Cache Based Session Setup Mechanism for IMS." IEEE International Conference on ICC Workshops '08. May 19, 2008. pp. 261-265. IEEE, Piscataway, NJ.
3rd Generation Partnership Project. "Optimisation of call routing in Serving to Serving procedure." 3GPP TSG SA2 IMS. Sophia Antipolis, France. pp. 1-3. Sep. 4, 2001.
3rd Generation Partnership Project. "Technical Specification Group Core Network and terminals: IP Multimedia (IM) Subsystem Cx and Dx Inferfaces; Signalling flows and message contents." 3GPP TS 29.228 v8.5.0. Sophia Antipolis, France. pp. 1-65. Mar. 1, 2009.

\* cited by examiner

*Primary Examiner* — Barry Taylor
(74) *Attorney, Agent, or Firm* — Coats & Bennett, P.L.L.C.

(57) ABSTRACT

The present invention provides a method in a call session control node (18, 200) for a packet-switched telecommunications network (10). The call session control node (18, 200) comprises an originating call handling function (202) and a terminating call handling function (204). The method comprises the steps of: receiving (100, 300) a message (14) for a called entity on the originating call handling function (202); determining (106, 400) with the originating call handling function (202) whether the called entity is registered with the call session control node (18, 200); and, if the called entity is registered with the call session control node (18, 200), routing (110, 500) the message (14) to the terminating call handling function (204), without traversing an inbound call session control function.

13 Claims, 5 Drawing Sheets

METHOD AND APPARATUS IN A TELECOMMUNICATIONS NETWORK

TECHNICAL FIELD

The present invention relates to telecommunications networks, and particularly to a method and an apparatus in a packet-switched telecommunications network for forwarding messages to a called entity.

BACKGROUND

The IP Multimedia Subsystem (IMS) is an architectural framework for delivering Internet Protocol (IP) multimedia services. It constitutes an approach to providing internet based multimedia services, including voice calls and messaging, to various wireless telecommunications networks, such as Global System for Mobile Communications (GSM), wireless LAN, and Universal Mobile Telecommunications System (UMTS), as well as fixed line networks. One of the protocols used in the IMS network is the Session Initiation Protocol (SIP). A terminal used with the IMS network is referred to as SIP terminal.

FIG. 1 shows a basic signalling diagram in an IMS network 10, for initiation of a call, or SIP session from one SIP User Agent (SIP UA (A)) 12 to another SIP UA (SIP UA (B)) 38. For clarity, the signalling diagram shows only the SIP signalling up to the arrival of a SIP Invite message at the destination party's terminal, i.e. SIP UA (B) 38. In addition, the signalling diagram does not reflect the user plane (media transport).

A SIP Invite message 14 is initiated in the SIP UA (A) 12, and sent to a Proxy Call Session Control Function (P-CSCF) 16 of user A. The SIP invite message 14 is forwarded from the P-CSCF 16 to a Serving CSCF (S-CSCF) 18 associated with user A.

An S-CSCF contains an internal database of the subscribers (i.e. users) registered with that S-CSCF. Thus, when the S-CSCF 18 of user A receives the SIP Invite message 14 from the P-CSCF 16 of user A, it uses the P asserted-ID (PAI) header of the SIP Invite message to obtain user A's registration data from the database, i.e. 'matches' the Invite message with a registered user.

The SIP Invite message 14 also contains some information identifying the called party, i.e. user B. Such information may include a public user identity of user B, or a telephone number of user B, for example. If the destination party is identified in the SIP Invite message 14 with a Universal Resource Identifier (URI) indicating an IMS user, then the S-CSCF 18 will apply outbound routing as described below. If the destination party is identified with a phone number, then the S-CSCF 18 will communicate with an E.164 Number Mapping node (ENUM) 20 in order to obtain a URI indication of the IMS user. The further action by the S-CSCF 18 is determined by the outcome of an ENUM query message 22 sent from the S-CSCF 18 to the ENUM 20. If the ENUM indicates to the S-CSCF 18, in the ENUM response message 24 to the aforementioned ENUM query 22, that the destination party is a subscriber of the IMS network, then the S-CSCF 18 will apply outbound routing as described below. Otherwise, the S-CSCF 18 takes a breakout to a Circuit-Switched (CS) network (not illustrated).

For outbound routing, the S-CSCF 18 forwards the SIP Invite message 14 to an Interrogating CSCF (I-CSCF) 26 associated with user B. The I-CSCF 26 is a SIP function located at the edge of an administrative domain. Its IP address is published in Domain Name System (DNS), so that remote servers (e.g. S-CSCF 18) can find it, and use it as a forwarding point for SIP messages to this domain.

The I-CSCF 26 communicates with a Home Subscriber Server (HSS) 28 to determine the S-CSCF with which user B is registered. The HSS 28 comprises a database containing the registration information of all users registered with that particular network. Thus, the I-CSCF 26 sends a Diameter Location Information Request (LIR) message 30 to the HSS 28, and receives a Diameter Location Information Answer (LIA) message 32 in reply, identifying the S-CSCF with which user B is registered.

The I-CSCF 26 forwards the SIP Invite message 14 to the S-CSCF 34 of user B. The S-CSCF 34 of user B, similarly to the S-CSCF 18 of user A, comprises a database of all users registered with it. On receipt of the SIP Invite message 14, the S-CSCF 34 looks up the user identified as the called party in the message, and forwards the message 14 to a P-CSCF 36 associated with user B. The P-CSCF 36 then forwards the message to the SIP UA (B) 38, and the path of the SIP Invite message 14 is complete.

Thus, it can be seen that, first, the S-CSCF 18 of user A may not have knowledge about the IMS network that the destination subscriber (user B) belongs to; this is especially true when user B is identified in the SIP Invite message 14 with an enterprise-specific domain name, such as sip: joe.bloggs@abb.se. Second, the S-CSCF 18 of user A has no knowledge of which S-CSCF, in the IMS network of user B, is serving user B.

For the purposes of the first issue, the S-CSCF 18 of user A applies 'egress routing'. This entails the S-CSCF 18 contacting DNS to obtain the address of an inbound proxy of the IMS network serving user B. This inbound proxy may be an I-CSCF 26 as in the illustrated example, or an Interconnect Border Control Function (IBCF) of the network serving user B. An IBCF is used between different IMS networks. If the inbound proxy is an IBCF, then the IBCF will take care to forward the call to an I-CSCF in the IMS network of user B.

For the purposes of the second issue, the I-CSCF 26 of user B's network will, once the call has arrived at that I-CSCF 26, contact the HSS 28 (of user B) to obtain the address of the S-CSCF currently serving user B.

The call can only then, using the information received by the I-CSCF 26 from the HSS 28, be routed further, from the I-CSCF 26 to the S-CSCF 34 of user B. The S-CSCF 34 may now process the terminating call.

It can be seen, therefore, that a relatively large amount of signalling is required to determine the necessary information for forwarding the call from a first user to a second user. Moreover, this signalling crosses a number of different nodes in the system 10, adding delay to the call process.

SUMMARY

It is an object of the present invention to reduce this signalling for at least some scenarios.

This object is achieved by the teaching of the independent claims.

According to a first aspect of the present invention, there is provided a method in a call session control node for a packet-switched telecommunications network. The call session control node comprises an originating call handling function and a terminating call handling function. The method comprises the steps of: receiving a message for a called entity on the originating call handling function. The method is characterized by the further steps of: determining with the originating call handling function whether the called entity is registered with the call session control node; and, if the called entity is registered with the call session control node, routing the message to the terminating call handling function without traversing an inbound call session control function.

According to a second aspect of the present invention, there is provided a call session control node for a packet-switched telecommunications network. The call session control node comprises an originating call handling function, a terminating call handling function, and processing circuitry. The originating call handling function is configured to receive a message for a called entity. The processing circuitry is configured to determine whether the called entity is registered with the call session control node. The terminating call handling function is configured to receive the message, routed from the originating call handling function without traversing an inbound call session control function, if it is determined that the called entity is an entity registered with the call session control node.

The invention therefore provides a method and an apparatus for forwarding a message to a called entity. By first checking to see if the called entity is registered with the call session control node, before potentially forwarding the message to an inbound call session control function, signalling in the packet-switched telecommunications network is reduced, and the delay in sending the message to the called entity may also be reduced.

According to embodiments of the present invention, the message may originate from a calling party, the calling party being registered with the call session control node, or from an application server. The called entity may be a called user or a public service.

According to further embodiments, the message may comprise an identity of the called entity. Alternatively, the message may comprise a telephone number of the called entity. In this event, the method comprises the further steps of sending a query message to a number mapping node; and receiving from the number mapping node a response message comprising an identity of the called party in the form of a universal resource identifier. In both of these embodiments, the call session control node may check the local database to see if the database comprises the identity.

According to an embodiment of the present invention, the number mapping mode is an E.164 Number Mapping node (ENUM).

In yet further embodiments, the called entity may not be registered with the packet-switched telecommunications network. In these embodiments, the method further comprises the steps of: determining that the called entity is not registered with the call session control node; forwarding the message towards an inbound call session control function; and receiving the message from the inbound call session control function. The called entity is at least temporarily registered with the call session control node.

Thus according to this embodiment of the present invention, the I-CSCF selects (or preferentially selects) the same call session control node which originally forwarded the message for the called entity to be registered with, at least temporarily. Optimization of signalling is achieved in this embodiment, in that further signalling, once the I-CSCF has dropped out of the signalling path, will take place internally in a single S-CSCF, instead of between two different S-CSCFs.

In another embodiment, the call session control node checks a subscriber server (e.g. a home subscriber server) or a database of registered entities (e.g. a local database of the call session control node) to determine whether the called entity is registered with the call session control node.

According to yet further embodiments, the message received by the originating call handling function may be an initial SIP (Session Initiation Protocol) request message, for example (a) initial SIP request messages that lead to the establishment of a session, such as SIP Invite or SIP Subscribe and (b) initial SIP request messages that do not lead to the establishment of a session, such as SIP Options or SIP Message.

According to an embodiment of the present invention, the packet-switched telecommunications network is an IP Multimedia Subsystem (IMS) network. According to a further embodiment of the present invention, the call session control node is a Serving Call Session Control Function (S-CSCF).

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 2:
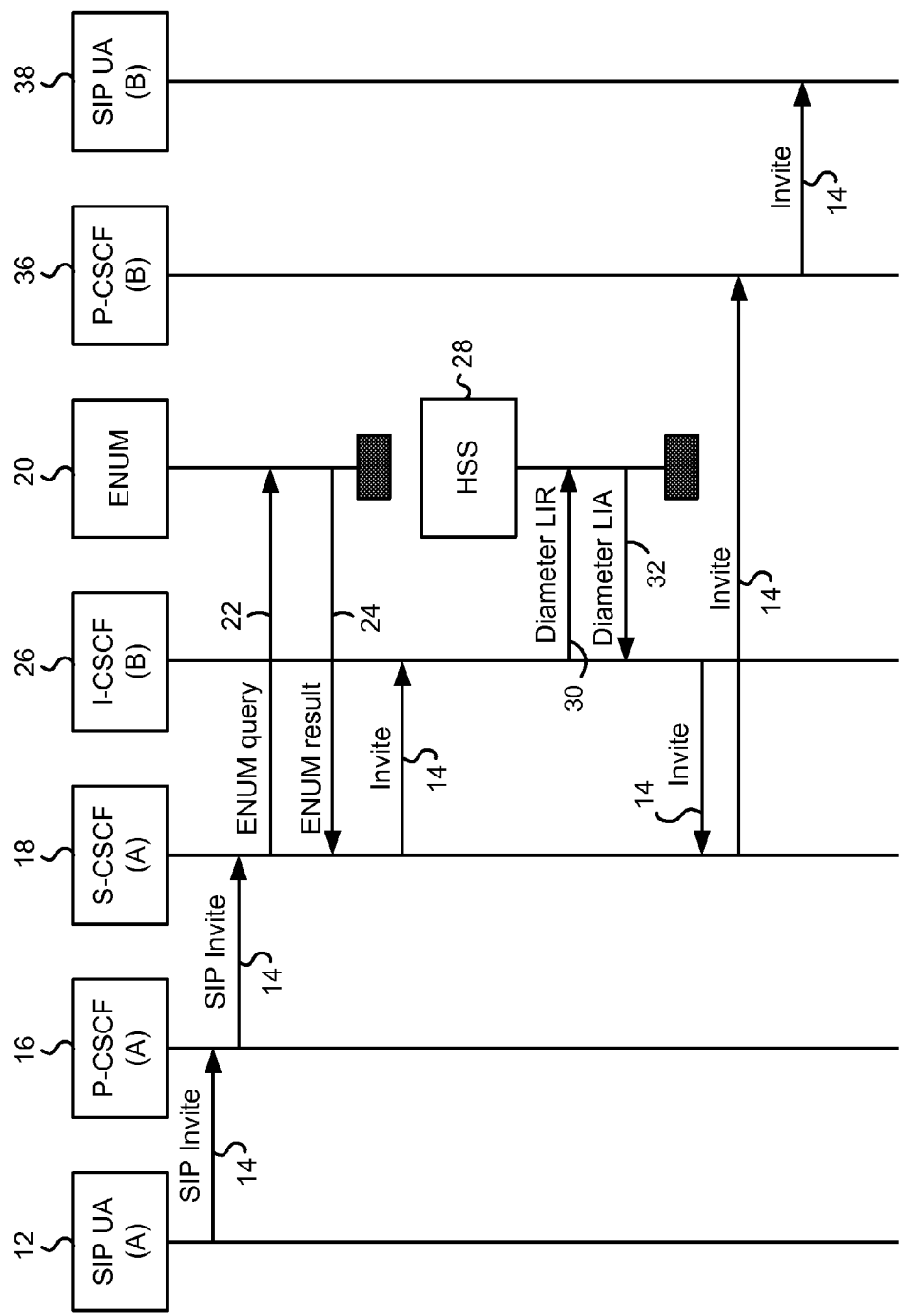
FIG. 2 is a signalling diagram of a conventional call initiation process in a packet-switched telecommunications network where the calling party and the called party are registered with the same serving call session control function.

Small networks may contain only one or a few Serving Call Session Control Functions (S-CSCF). Similarly, they may also have only one or a few Interrogating CSCFs (I-CSCFs) and Proxy CSCFs (P-CSCFs). When a call is established between two users who are both subscribers of such a network, it is likely that both users will be registered with the same S-CSCF, and the call establishment signalling will terminate in the same S-CSCF as where the call originated. FIG. 2 shows a signalling diagram for the conventional method in such a scenario.

Figure 1:
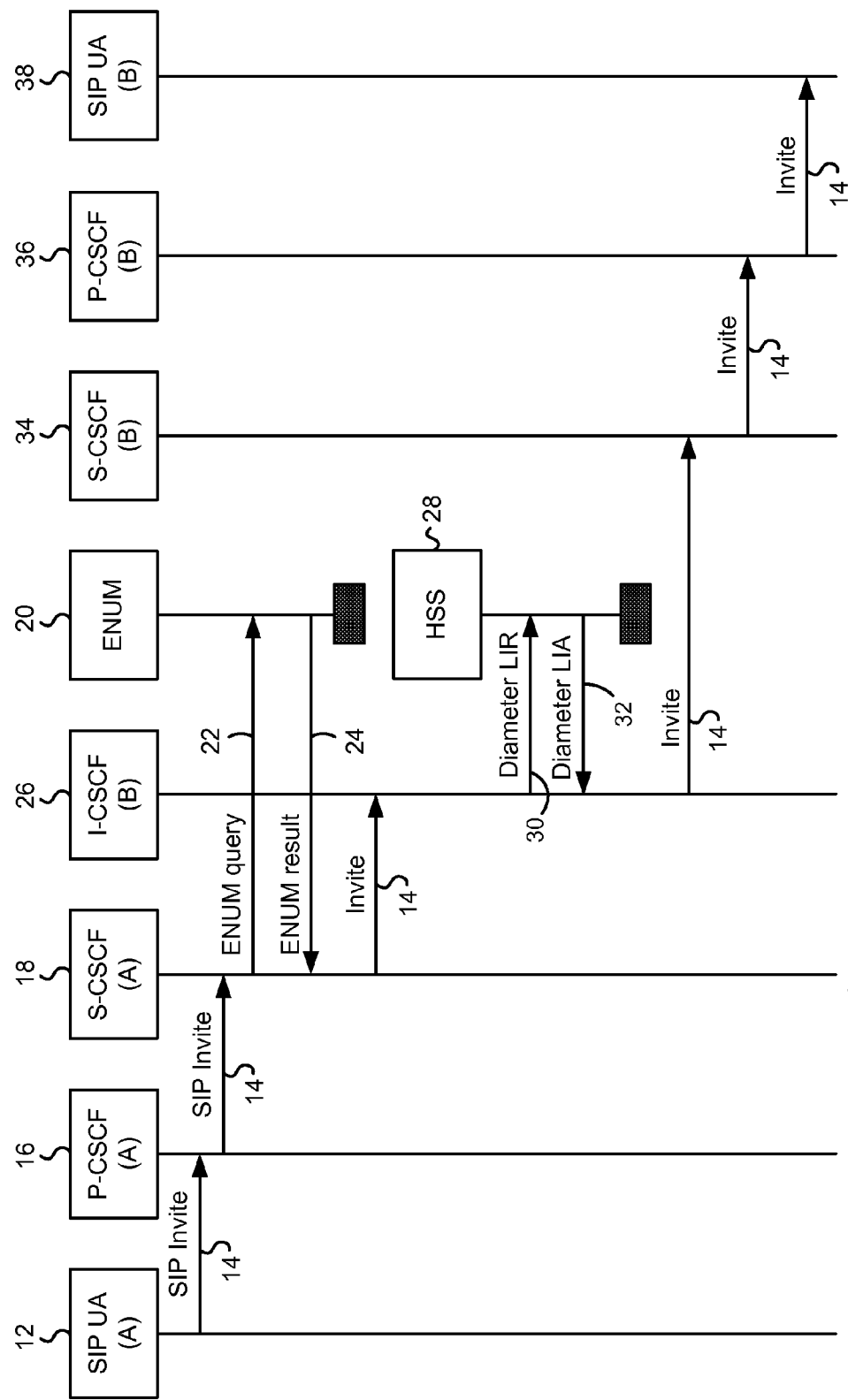
FIG. 1 is a signalling diagram of a conventional call initiation process in a packet-switched telecommunications network.

The signalling diagram is similar to that described with respect to FIG. 1, and follows the same principles. Indeed, the signalling is the same for the majority of the process, so only the major differences will be described herein.

As previously mentioned, the calling party and called party are registered with the same network S-CSCF, i.e. the S-CSCF 18 of the called party, i.e. user B, is also the S-CSCF 18 of the calling party, i.e. user A.

The I-CSCF 26 consults the Home Subscription Server (HSS) 28 as normal to determine the S-CSCF of user B. However, as both user A and user B are registered with the same S-CSCF, the HSS 28 identifies in its Diameter Location Information Answer (LIA) message the S-CSCF 18 with which the call originated. The I-CSCF 26 therefore forwards the Session Initiation Protocol (SIP) Invite message 14 back to the same S-CSCF 18 from which it was earlier received.

The S-CSCF 18 now acts as the S-CSCF on the terminating side of the call establishment process, and forwards the SIP Invite message 14 to the P-CSCF 36 of user B, which forwards the message to the SIP UA (B) 38. The P-CSCF 36 of user B may or may not be the same node as the P-CSCF 16 of user A.

Thus it can be seen that the network operates in substantially the same way as if user A and user B were registered in separate networks (as shown in FIG. 1) or were registered in the same network, but in different S-CSCFs. The I-CSCF 26, being stateful proxy, has to process all responses to the SIP Invite, as well as an Ack request to a non-2xx final response (if applicable) and a Cancel request and response (if applicable). Put differently, the I-CSCF remains involved (keeps a process active) for all signalling messages related to the handling of the Invite transaction. Stateful proxy, Ack request and Cancel request are terms which will be known to the reader acquainted with SIP. In addition, the I-CSCF 26 has to keep two transaction state models (e.g. Invite transaction state models) active for the entire duration of the SIP transaction, namely, a server transaction state model, which was started when the I-CSCF 26 received the initial SIP Invite message 14, and a client transaction state model, which was started when the I-CSCF 26 forwarded the initial SIP Invite message 14 to the S-CSCF 18.

According to embodiments of the present invention, the relatively low number of S-CSCFs in packet-switched networks is exploited to reduce the amount of signalling and so save resources in certain scenarios to be described in greater detail herein.

Figure 3:
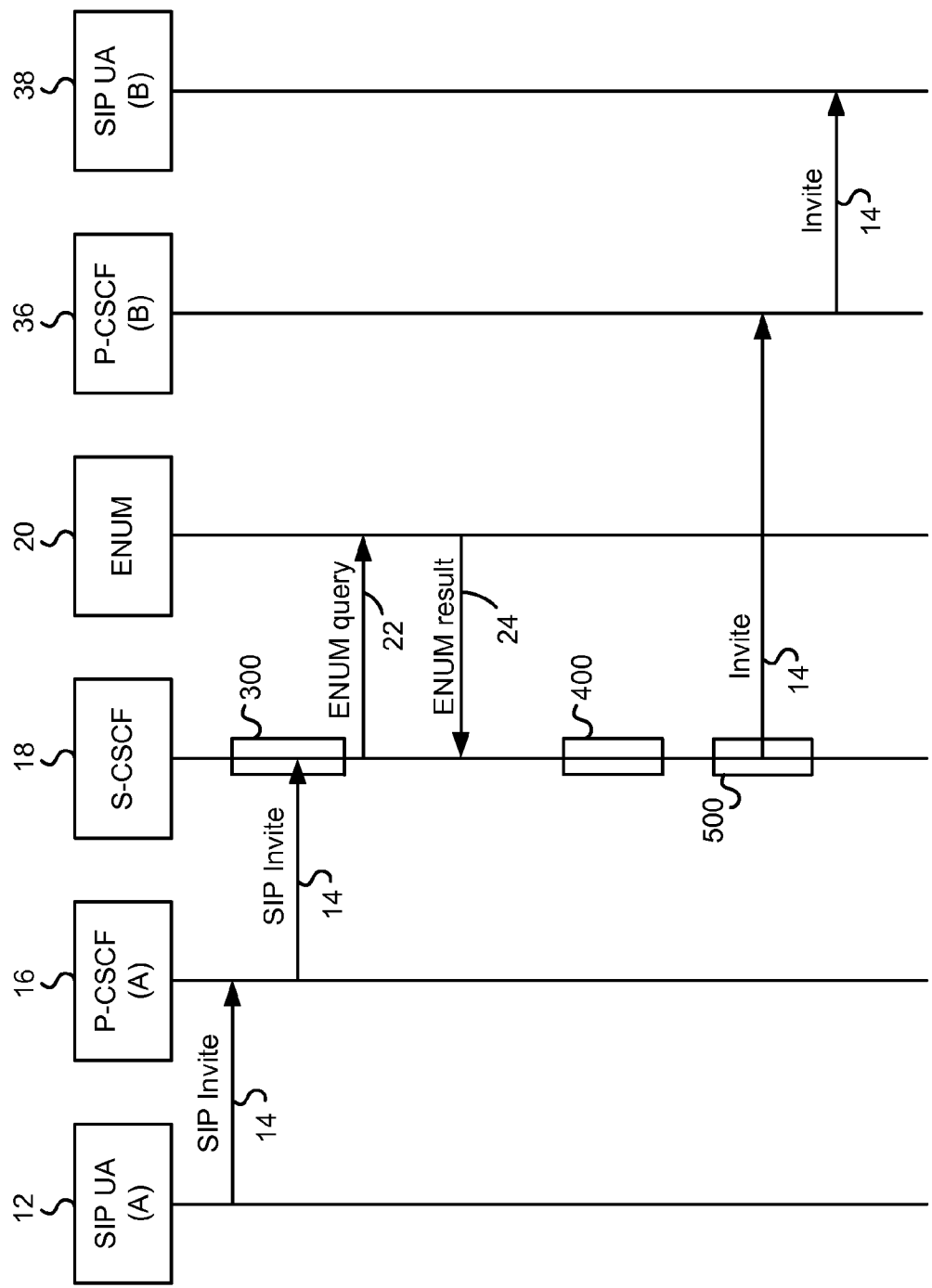
FIG. 3 is a signalling diagram of a call initiation process in a packet-switched telecommunications network according to embodiments of the present invention.

FIG. 3 is a signalling diagram of a call initiation process in a packet-switched telecommunications network according to embodiments of the present invention, where the calling party (user A) and the called party (user B) are subscribers of the same packet-switched telecommunications network and are registered with the same S-CSCF in that network.

A SIP Invite message 14 is initiated in the SIP UA (A) 12, and is sent to a P-CSCF 16 of user A. The SIP invite message 14 is forwarded from the P-CSCF 16 to an S-CSCF 18 associated with user A.

In a first step (marked "300" in FIG. 3), the SIP Invite message 14 is received by the S-CSCF 18 and, optionally, the S-CSCF 18 may communicate with an E.164 Number Mapping node (ENUM) 20 to gather further information about the called party. In another embodiment (not shown), the S-CSCF 18 may receive the SIP Invite message 14 from a SIP application server (SIP-AS).

The SIP Invite message 14 contains information identifying the called party, i.e. user B. Such information may include a public user identity of user B, or a telephone number of user B, for example. If the destination party is identified in the SIP Invite message 14 with a Universal Resource Identifier (URI) indicating a user, then the S-CSCF 18 will apply outbound routing as described below. If the destination party is identified with a phone number, then the S-CSCF 18 will communicate with an E.164 Number Mapping node (ENUM) 20 in order to obtain a URI indication of the user. The further action by the S-CSCF 18 is determined by the outcome of an ENUM query message 22 sent from the S-CSCF 18 to the ENUM 20. If the ENUM indicates to the S-CSCF 18, in the ENUM response message 24 to the aforementioned ENUM query 22, that the destination party is a subscriber of an IMS network, then the S-CSCF 18 will apply outbound routing as described below. Otherwise, the S-CSCF 18 takes a breakout to a Circuit-Switched (CS) network (not illustrated).

As previously mentioned, an S-CSCF contains an internal database of the subscribers (i.e. users) registered with that S-CSCF. Thus, when the S-CSCF 18 receives the SIP Invite message 14 from the P-CSCF 16 of user A, it uses the P-asserted-ID (PAI) header of the SIP Invite message to obtain user A's registration data from the database, i.e. 'matches' the Invite message with a registered user. In a second step (marked "400" in FIG. 3), the S-CSCF 18 further checks its database to see whether this database contains user B as a registered user. That is, the S-CSCF 18 checks its database to see whether the user specified in the Request-URI (R-URI) of the SIP Invite message 14 (or possibly specified in the ENUM result message 24) is present. Alternatively, the S-CSCF 18 may communicate directly with an HSS (not illustrated) to determine if the called entity is registered with the S-CSCF 18. In the illustrated example, user B is registered with the S-CSCF 18 and so is present in its database.

In a third step (marked "500" in FIG. 3), the S-CSCF 18 forwards the SIP Invite message 14 to the P-CSCF 36 associated with user B, which may or may not be the same node as P-CSCF 16 associated with user A without traversing an I-CSCF. The P-CSCF 36 then forwards the SIP Invite message 14 to SIP UA (B) 38, and the message-forwarding process is complete.

Thus, the illustrated embodiment of the present invention provides a method for forwarding a message from a calling party to a called party without traversing an I-CSCF, resulting in reduced signalling (and therefore lower resource requirements) and reduced delays.

However, the present invention is also applicable in other circumstances. For example, although FIG. 3 illustrates the scenario where a SIP Invite message is forwarded from one user to another, the present invention is applicable to any type of message forwarded on the packet-switched telecommunications network 10, such as (a) initial SIP request messages that lead to the establishment of a session, such as SIP Invite or SIP Subscribe and (b) initial SIP request messages that do not lead to the establishment of a session, such as SIP Options or SIP Message.

Further, the present invention is also applicable when the initial request message does not originate from a calling party registered with the same S-CSCF as the called party, but originates from an application server. For example, an application server may establish a call, by sending a SIP Invite request message (or other message as mentioned above) to a S-CSCF; potentially via an I-CSCF. This S-CSCF will now apply behaviour as for originating call handling, meaning that it will try to route the Invite message to the S-CSCF where the called party is registered. It does this by applying ENUM query (if needed), locating an inbound I-CSCF of the called party, sending the Invite message to that I-CSCF, etc., as shown in FIG. 2. In this use case, the called party may be registered in the same S-CSCF as the one that is now busy handling the SIP Invite received from the application server. In that case, the invention may also be used, by having this S-CSCF check whether the called party is by chance registered in this same S-CSCF.

With reference to FIG. 3, therefore, this is equivalent to the S-CSCF 18 receiving the SIP Invite message 14 (or other message) from an application server, possibly via an I-CSCF, rather than from the P-CSCF 16. The signalling then proceeds as described with respect to FIG. 3.

It will also be apparent to those skilled in the art that the called party, described in the preceding text as a user, may also be a public service registered with an S-CSCF. Public services are registered with S-CSCFs as are users, and so the called entity may be a user or a public service.

According to embodiments of the present invention, therefore, a serving call session control node (e.g. S-CSCF 18), operating as an originating call handling node, receives a message and checks its local database to see whether the called entity specified in that message is registered with that serving call session control node. If the called entity is registered with the serving call session control node, the message is forwarded directly to the terminating call handling function in the S-CSCF and from there to the called entity without traversing an inbound call session control function.

Figure 4:
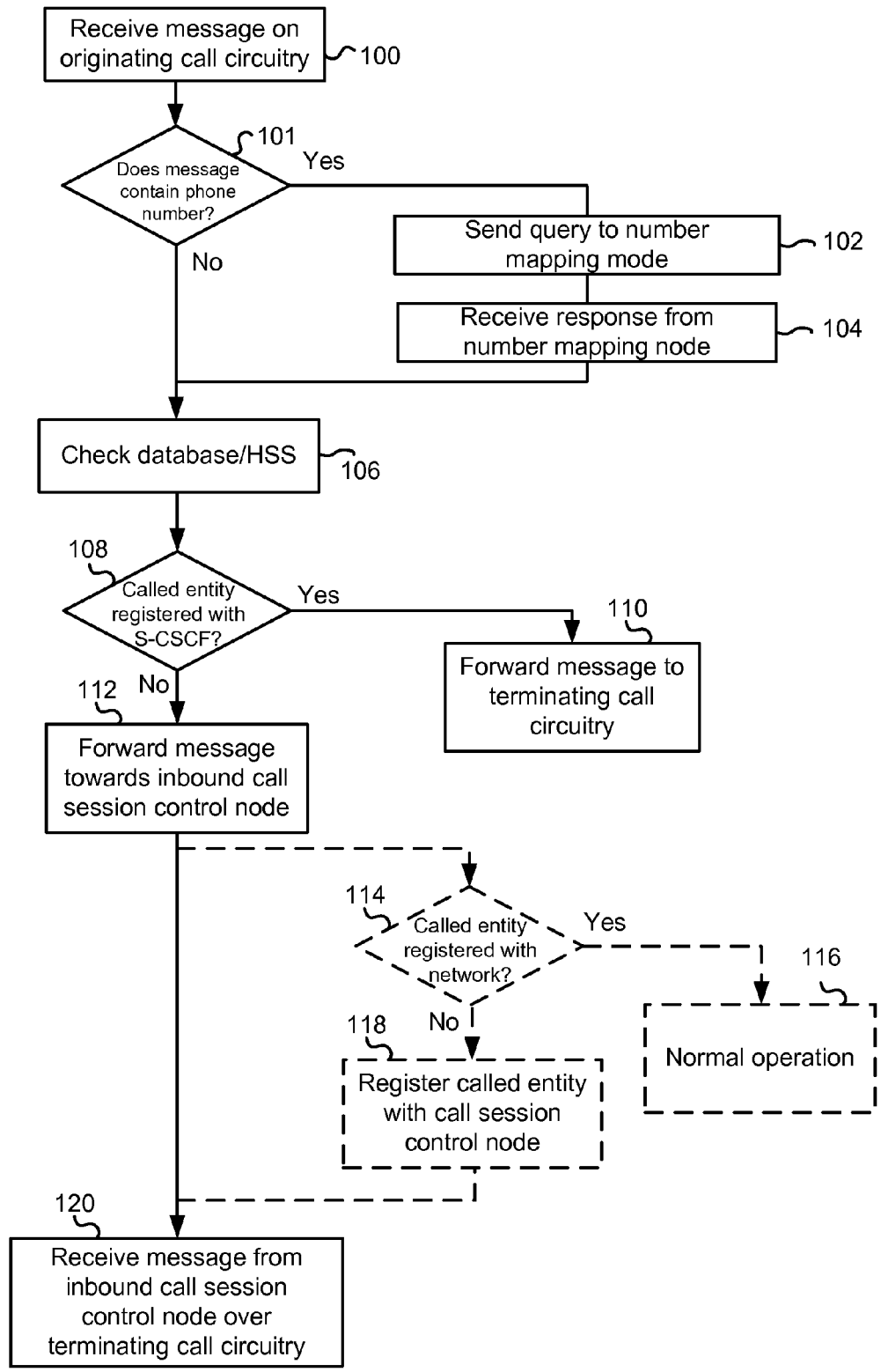
FIG. 4 is a flowchart of a method in a call session control node according to embodiments of the present invention.

FIG. 4 is a flowchart illustrating a method according to embodiments of the present invention, performed in a call session control node (e.g. a serving call session control function). For clarity, steps performed outside the call session control node are shown in dashed lines.

The method begins in step 100, where a message is received on originating call circuitry of the call session control node. As noted above, in one embodiment the message may be a SIP request message, such as SIP Invite, SIP Subscribe, SIP Options or SIP Message, etc. The message may be received from a P-CSCF associated with a calling party, or from an application server.

The message comprises an indication of a called entity (e.g. a user or a public service), i.e. a destination for the message. This may be in the form of an R-URI, containing a tel URI or an R-URI containing a SIP URI. When the R-URI contains a SIP URI, this SIP URI may represent a phone number.

Depending on the contents of the R-URI, i.e. whether the R-URI contains a phone number (step 101), the call session control node may send a query message (e.g. ENUM Query message) to a number-mapping node (e.g. an ENUM) in step 102. In this case, the call session control node receives a response (e.g. ENUM Result message) in step 104.

In the next step 106, the call session control node checks its local database of registered users, and in step 108 determines whether the called entity specified in the received message (or specified in the received response from the number-mapping node) is a registered user of the call session control node. Alternatively, the call session control node may communicate directly with an HSS in step 106 and then determine if the called entity is a registered user of the call session control node (step 108). If the database reveals that the called entity is registered with the call session control node, the message received in step 100 is forwarded towards that called party via terminating call circuitry of the call session control node, step 110. That is, the message is forwarded internally, without traversing an inbound call session control function, to the terminating call circuitry. The message may be forwarded directly to a P-CSCF of the called entity, as shown in FIG. 3. It will be understood by the person skilled in the art that if the called entity is a public service, the message will not be forwarded to a P-CSCF, but will be forwarded to the public service. It will be further understood that if the called entity is an IMS subscriber using a non-SIP phone as the terminal, e.g. a GSM phone, then the message may be forwarded to a Media Gateway Control Function (MGCF) for delivery of this call to the non-SIP phone, instead of being forwarded to a P-CSCF.

If, in step 108, a check of the database shows that the called entity is not registered with the call session control node, the message is forwarded towards an inbound call session control node associated with the network of the called entity, step 112. The message may cross an Interconnect Border Control Function (IBCF) of the network serving the called entity (if the called entity is a subscriber of a different network to the call session control node), or it may not (if the called entity is a subscriber of the same network as the call session control node).

On receipt of the message from the call session control node, the I-CSCF communicates with the HSS to determine whether the called entity is a registered user of the network (step 114). For example, the I-CSCF communicates with the HSS as described with respect to FIGS. 1 and 2 (e.g. using Diameter Location Information Requests and Answers) to determine with which S-CSCF the called entity is registered.

If the called entity is registered with the network and with a particular S-CSCF, normal operation is maintained (step 116). That is, the I-CSCF forwards the message to the identified S-CSCF as described with respect to FIG. 1.

If it is determined in step 114 that the called entity is not registered with the network, the HSS provides the I-CSCF with a number of 'S-CSCF capabilities', facilitating the I-CSCF to select an S-CSCF that shall handle the call (or other message) for the called entity. The I-CSCF then routes the call to this selected S-CSCF and the called entity will be temporarily registered in the selected S-CSCF.

According to embodiments of the present invention, the I-CSCF selects (or preferentially selects) the same call session control node which forwarded the message in step 112 for the called entity to be registered with, at least temporarily (step 118). Thus, the message is forwarded from the I-CSCF to the call session control node, and received by the call session control node over its terminating call circuitry in step 120. Optimization of signalling is achieved in this embodiment, in that further signalling, once the I-CSCF has dropped out of the signalling path, will take place internally in a single S-CSCF, instead of between two different S-CSCFs.

Figure 5:
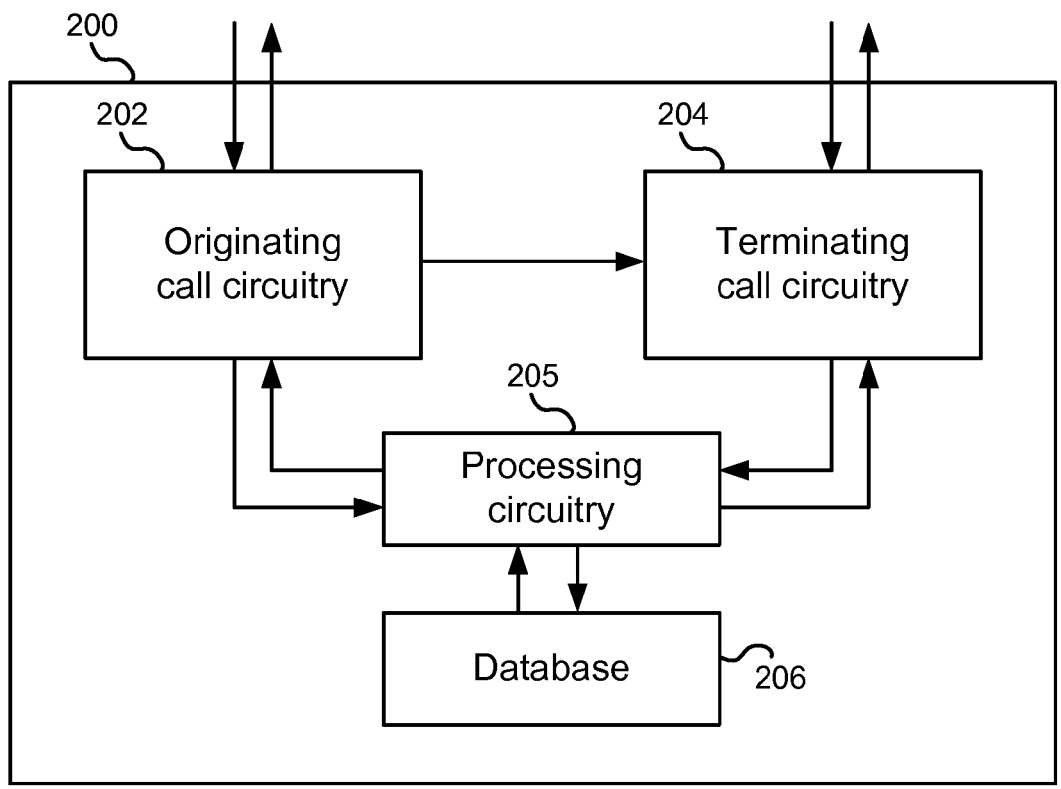
FIG. 5 is a schematic diagram of a call session control node according to embodiments of the present invention.

FIG. 5 schematically illustrates a call session control node 200 according to embodiments of the present invention. The call session control node 200 is capable of operation as the S-CSCF 18 in FIG. 3, or the call session control node for performing the method of FIG. 4.

The call session control node 200 comprises originating call handling circuitry 202, terminating call handling circuitry 204, processing circuitry 205, and a database 206 of users registered with the call session control node. These components may be in the same apparatus housing or in separate housings; for example, the database 206 may be in the same unit as the originating call handling circuitry 202, terminating call handling circuitry 204 and processing circuitry 205, or it may be on a separate server. The originating call handling circuitry 202 is configured to receive messages from network nodes on the originating side of a call process, and to send messages relating to that originating side of the call process. For example, the originating call handling circuitry 202 may receive a message from a P-CSCF, or from an application server, and forward that message to an I-CSCF.

The terminating call handling circuitry 204 is configured to send and receive messages relating to the terminating side of a call process. For example, the terminating call handling circuitry 204 may receive messages from an I-CSCF, and forward them to a P-CSCF.

The database 206 comprises a list of all the users registered with the call session control node 200. This database contains, per registered user, one or more public user identities, each having the form of a phone number or a URI. The database contains, in addition, per registered user, one or more contact addresses that may be used for delivering an incoming call to one or more terminals of that user, as well as a set of data that may be used for invoking SIP Application Server (SIP-AS) based services for calls from or to that user. It will be understood by those skilled in the art that if the registered user represents a public service, or the registered user relates to a user whose terminal is currently switched off, there may be a user profile in the database, but no contact address.

Both originating call handling circuitry 202 and terminating call handling circuitry 204 are coupled to the processing circuitry 205, which is itself coupled to the database 206, such that it can be determined whether called parties indicated in received messages are registered with the call session control node 200. According to embodiments of the invention, if it is determined that a message received on the originating call handling circuitry 202 is for a called party who is registered with the call session control node, the message is routed from the originating call handling circuitry 202 to the terminating call handling circuitry 204 without being sent to an I-CSCF.

According to other embodiments of the invention, a called entity that is not registered with a packet-switched network may be at least temporarily registered with the call session control node 200 (i.e. the details of the entity may be included in the database 206). Once such temporary registration has taken place, further messages between the calling party and the called entity may be routed directly between the originating call handling circuitry 202 and the terminating call handling circuitry 204 as discussed above.

The present invention therefore provides a method and an apparatus in a packet-switched telecommunications network, for forwarding a message to a called party without that message traversing an I-CSCF, resulting in reduced amounts of signalling in the message-forwarding process, and possibly reducing delays between calling parties and called parties.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a call session control node for a packet-switched telecommunications network, the call session control node comprising an originating call handling function and a terminating call handling function, the method comprising:
   receiving a message for a called entity on the originating call handling function;
   determining with the originating call handling function whether the called entity is registered with the call session control node; and
   if the called entity is registered with the call session control node, routing the message to the terminating call handling function, without traversing an inbound call session control function;
   if the called entity is not registered with the call session control node, performing the steps of:
      forwarding the message towards an inbound call session control function;
      receiving the message from the inbound call session control function; and
      registering the called entity, at least temporarily, with the call session control node.

2. The method as claimed in claim 1, wherein the message originated from one of a calling party registered with the call session control node, and from an application server.

3. The method as claimed in claim 1, wherein the message comprises an identity of the called entity.

4. The method as claimed in claim 3, wherein determining with the originating call handling function whether the called entity is registered with the call session control node comprises determining whether a database comprises the identity.

5. The method as claimed in claim 1, wherein the message comprises a telephone number of the called entity, and wherein the method further comprises:
   sending a query message to a number mapping node; and
   receiving from the number mapping node a response message comprising an identity of the called party in the form of a universal resource identifier.

6. The method as claimed in claim 1, wherein determining with the originating call handling function whether the called entity is registered with the call session control node comprises checking one of a subscriber server and a database of registered entities.

7. The method as claimed in claim 1, wherein the called entity is one of a called user and a public service.

8. A call session control node for a packet-switched telecommunications network, the call session control node comprising:
   an originating call handling function configured to receive a message for a called entity;
   processing circuitry configured to determine whether the called entity is registered with the call session control node; and
   a terminating call handling function;
   wherein when it is determined that the called entity is an entity registered with the call session control node, the terminating call handling function being configured to receive the message routed from the originating call handling function without traversing an inbound call session control function;
   wherein when it is determined that the called entity is not registered with the call session control node, the originating call handling function being configured to forward the message to an inbound call session control function, and the terminating call handling function being configured to receive the message from the inbound call session control function, and wherein the called entity is at least temporarily registered with the call session control node.

9. The call session control node as claimed in claim 8, wherein the originating call handling function is configured to receive the message that originated from a calling party that is registered with the call session control node, and to receive the message that originated from an application server.

10. The call session control node as claimed in claim 8, wherein the message comprises an identity of the called entity.

11. The call session control node as claimed in claim 10, wherein the terminating call handling function is configured to receive the message, internally routed from the originating call handling function, if it is determined that a database comprises the identity.

12. The call session control node as claimed in claim 8, wherein the message comprises a telephone number of the called entity, and wherein the originating call handling function is configured to send a query message to a number mapping node and to receive from the number mapping node a response message comprising an identity of the called entity in the form of a universal resource identifier.

13. The call session control node as claimed in claim 8, wherein the called entity is one of a called user and a public service.

* * * * *

UNITED STATES PATENT AND TRADEMARK OFFICE
CERTIFICATE OF CORRECTION

PATENT NO. : 8,620,316 B2  
APPLICATION NO. : 13/390310  
DATED : December 31, 2013  
INVENTOR(S) : Noldus Page 1 of 1

It is certified that error appears in the above-identified patent and that said Letters Patent is hereby corrected as shown below:

On the Title Page, in Item (56), under "OTHER PUBLICATIONS", in Column 2, Line 9, delete "Inferfaces;" and insert -- Interfaces; --, therefor.

In the Specification
In Column 5, Line 53, delete "EN UM 20." and insert -- ENUM 20. --, therefor.

Signed and Sealed this
Twenty-ninth Day of July, 2014

Michelle K. Lee
*Deputy Director of the United States Patent and Trademark Office*